US009632269B1

(12) United States Patent
Galvan Mijangos et al.

(10) Patent No.: US 9,632,269 B1
(45) Date of Patent: Apr. 25, 2017

(54) SYSTEMS FOR STACKING MODULAR FIBER OPTIC CABINETS, AND RELATED DEVICES, COMPONENTS, AND METHODS

(71) Applicant: CORNING OPTICAL COMMUNICATIONS LLC, Hickory, NC (US)

(72) Inventors: Cesar Alberto Galvan Mijangos, Tamaulipas (MX); Sergio Sanchez Garcia, Tamaulipas (MX)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 22 days.

(21) Appl. No.: 14/951,612

(22) Filed: Nov. 25, 2015

(51) Int. Cl.
*G02B 6/46* (2006.01)
*G02B 6/44* (2006.01)

(52) U.S. Cl.
CPC .......... *G02B 6/4446* (2013.01); *G02B 6/445* (2013.01)

(58) Field of Classification Search
CPC .... G02B 6/4441; G02B 6/4446; G02B 6/445; G02B 6/4452
See application file for complete search history.

(56) References Cited

U.S. PATENT DOCUMENTS

| | | | |
|---|---|---|---|
| 5,570,450 A * | 10/1996 | Fernandez | G02B 6/4452 385/134 |
| 6,921,212 B2 | 7/2005 | Doyle | |
| 8,175,438 B2 * | 5/2012 | Fabrykowski | G02B 6/4452 385/135 |
| 8,498,511 B2 | 7/2013 | Reagan et al. | |
| 2010/0310221 A1 * | 12/2010 | Le Dissez | G02B 6/4452 385/135 |
| 2012/0201503 A1 * | 8/2012 | Reagan | G02B 6/4452 385/135 |
| 2013/0228368 A1 * | 9/2013 | Declerck | H02G 3/30 174/481 |

(Continued)

FOREIGN PATENT DOCUMENTS

| | | |
|---|---|---|
| DE | 3339743 A1 | 5/1985 |
| EP | 2141528 A1 | 1/2010 |
| WO | 9222842 A2 | 12/1992 |

OTHER PUBLICATIONS

International Search Report and Written Opinion PCT/US2016/057632 Dated Feb. 1, 2017.

*Primary Examiner* — Michelle R Connelly
(74) *Attorney, Agent, or Firm* — Robert Low Branham

(57) ABSTRACT

A modular fiber optic cabinet system comprises a fiber optic cabinet and a transition skirt. The fiber optic cabinet comprises a cabinet top support portion, a cabinet bottom support portion, a pair of cabinet sidewalls extending therebetween, and a pair of downwardly extending cabinet flange portions. The transition skirt comprises a skirt top support portion, a skirt bottom support portion, a pair of skirt side walls extending therebetween, and a pair of downwardly extending skirt flange portions. The skirt bottom support portion of the transition skirt is configured to matingly engage with the top support portion of the fiber optic cabinet such that the skirt flange portions of the transition skirt cover respective portions of the cabinet side walls. The skirt top support portion of the transition skirt is similarly configured to matingly engage with the cabinet bottom support portion of the fiber optic cabinet.

20 Claims, 10 Drawing Sheets

(56) References Cited

U.S. PATENT DOCUMENTS

2014/0126870 A1\* 5/2014 Landry ................ G02B 6/4452
                                                             385/135
2016/0216467 A1\* 7/2016 Reagan ................ G02B 6/3849

\* cited by examiner

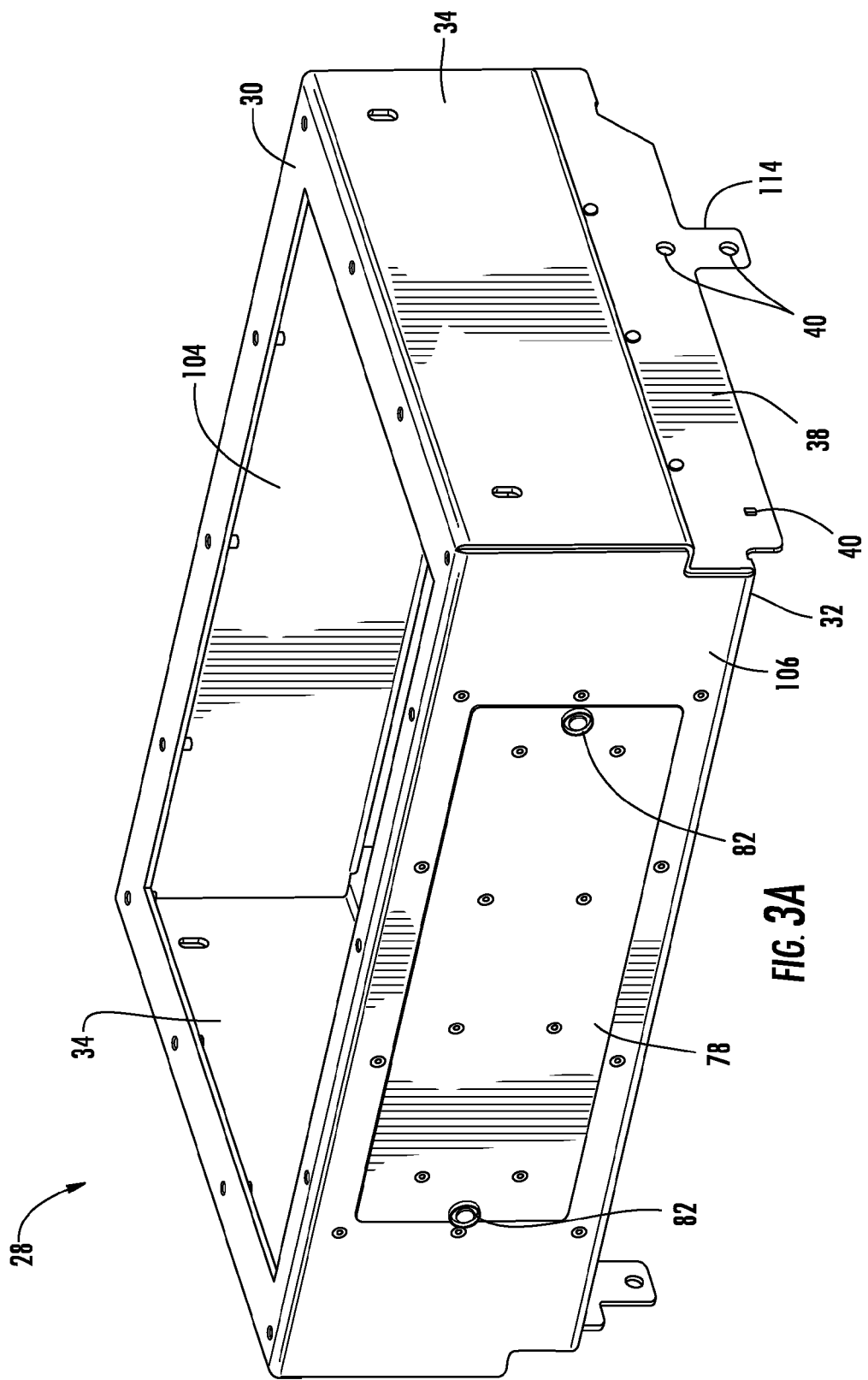

SYSTEMS FOR STACKING MODULAR FIBER OPTIC CABINETS, AND RELATED DEVICES, COMPONENTS, AND METHODS

BACKGROUND

The disclosure relates to fiber optic cabinets for housing fiber optic equipment, and more particularly to systems for stacking modular fiber optic cabinets, and related devices, components, and methods.

Benefits of utilizing optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed for use in delivering voice, video, and data transmissions to subscribers over both private and public networks. These fiber optic networks often include separated connection points linking optical fibers to provide "live fiber" from one connection point to another. In this regard, fiber optic equipment is located in data distribution centers or central offices to support live fiber interconnections. For example, the fiber optic equipment can support interconnections between servers, storage area networks (SANs), and/or other equipment at data centers. Interconnections may be further supported by fiber optic patch panels or modules.

Fiber optic equipment is customized based on application and connection bandwidth needs. The fiber optic equipment is typically included in housings, such as fiber optic cabinets, that are mounted in equipment racks to optimize use of space, and to facilitate installation and maintenance of the fiber optic equipment. One example of a fiber optic cabinet is a fiber optic distribution outdoor cabinet, which is configured to be installed in an outdoor environment where it is exposed to the elements. Conventional fiber optic distribution outdoor cabinets and other outdoor cabinets may be relatively large and monolithic, however. This in turn makes it difficult to expand or otherwise scale up the capacity of a fiber optic cabinet installation without significantly increasing the footprint of the installation.

SUMMARY

Embodiments of the disclosure include systems for stacking modular fiber optic cabinets and related devices, components, and methods. In one embodiment, a modular fiber optic cabinet system comprises a fiber optic cabinet and a transition skirt. The fiber optic cabinet comprises a cabinet top support portion and a cabinet bottom support portion. A pair of cabinet sidewalls extends therebetween to define an interior space for installing and storing fiber optic equipment, such as fiber optic cassettes, fiber optic panels, fiber optic modules, and fiber optic cable, for example. The cabinet bottom support portion can be supported by a base, with cabinet flange portions extending downwardly from the cabinet bottom support portion. The pair of cabinet side walls and the pair of cabinet flange portions both have a plurality of apertures extending therethrough to facilitate mounting the fiber optic cabinet to other modular elements, such as the base or the transition skirt, for example.

The transition skirt comprises a skirt top support portion and a skirt bottom support portion, with a pair of skirt side walls extending therebetween. A pair of skirt flange portions extends downwardly from the skirt bottom support portion, and both the skirt top support portion and the skirt bottom support portion have a plurality of apertures extending therethrough to facilitate mounting the transition skirt to other modular elements, such as the fiber optic cabinet. In this embodiment, the skirt bottom support portion of the transition skirt is configured to matingly engage with the top support portion of the fiber optic cabinet. In this configuration, the skirt flange portions of the transition skirt cover respective portions of the cabinet side walls, and the plurality of apertures of the skirt flange portions are aligned with the plurality of apertures of the cabinet side walls, thereby facilitating attachment of the transition skirt to the top of the fiber optic cabinet. The skirt top support portion of the transition skirt is similarly configured to matingly engage with the cabinet bottom support portion of the fiber optic cabinet. In this configuration, the cabinet flange portions of the fiber optic cabinet cover respective portions of the skirt side walls, and the plurality of apertures of the cabinet flange portions are aligned with the plurality of apertures of the skirt side walls.

This arrangement permits a pair of fiber optic cabinets to be stacked one on top of the other, with the transition skirt disposed therebetween to secure the fiber optic cabinets to each other. For example, a first fiber optic cabinet can be installed on a base, and a transition skirt can be installed on the top of the first fiber optic cabinet. A second fiber optic cabinet can then be installed on the top of the transition skirt. In this manner, a smaller, modular fiber optic cabinet can be installed in a location where less fiber optic capacity is needed, and additional fiber optic cabinets can be added over time as capacity requirements increase, without increasing the footprint of the original installation.

In one embodiment, a modular fiber optic cabinet system is disclosed. The system comprises a fiber optic cabinet. The fiber optic cabinet comprises a cabinet top support portion. The fiber optic cabinet further comprises a cabinet bottom support portion configured to be supported by a base. The fiber optic cabinet further comprises a pair of cabinet side walls each extending between the cabinet top support portion and the cabinet bottom support portion. Each cabinet side wall has a plurality of apertures therethrough. The fiber optic cabinet further comprises a pair of cabinet flange portions each having a plurality of apertures extending therethrough. Each cabinet flange portion extends downwardly from the cabinet bottom support portion. The system further comprises a transition skirt. The transition skirt comprises a skirt top support portion and a skirt bottom support portion. The transition skirt further comprises a pair of skirt side walls each extending between the skirt top support portion and the skirt bottom support portion. Each skirt side wall has a plurality of apertures therethrough. The transition skirt further comprises a pair of skirt flange portions each having a plurality of apertures extending therethrough. Each skirt flange portion extends downwardly from the skirt bottom support portion. The transition skirt is configured to matingly engage with the top support portion of the fiber optic cabinet such that the skirt flange portions of the transition skirt cover respective portions of the cabinet side walls, and the plurality of apertures of the skirt flange portions are aligned with the plurality of apertures of the cabinet side walls. The transition skirt is further configured to matingly engage with the cabinet bottom support portion of the fiber optic cabinet such that the cabinet flange portions of the fiber optic cabinet cover respective portions of the skirt side walls, and the plurality of apertures of the cabinet flange portions are aligned with the plurality of apertures of the skirt side walls.

In another embodiment, a transition skirt for a modular fiber optic cabinet system is disclosed. The transition skirt comprises a skirt top support portion and a skirt bottom support portion. The transition skirt further comprises a pair of skirt side walls each extending between the skirt top support portion and the skirt bottom support portion. Each skirt side wall has a plurality of apertures therethrough. The transition skirt further comprises a pair of skirt flange portions each having a plurality of apertures extending therethrough. Each skirt flange portion extends downwardly from the skirt bottom support portion. The transition skirt is configured to matingly engage with a top support portion of a fiber optic cabinet such that the skirt flange portions of the transition skirt cover respective portions of cabinet side walls, and the plurality of apertures of the skirt flange portions are aligned with a plurality of apertures of the cabinet side walls. The transition skirt is further configured to matingly engage with a bottom support portion of the fiber optic cabinet such that cabinet flange portions of the fiber optic cabinet cover respective portions of the skirt side walls, and apertures of the cabinet flange portions are aligned with the plurality of apertures of the skirt side walls.

In another embodiment, a method of assembling a modular fiber optic cabinet system is disclosed. The method comprises matingly engaging a transition skirt with a cabinet top support portion of a first fiber optic cabinet such that cabinet flange portions extending downwardly from a skirt bottom support portion of the transition skirt cover respective portions of cabinet side walls extending between the top support portion of the first fiber optic cabinet and a bottom support portion of the first fiber optic cabinet. Apertures of the skirt flange portions of the transition skirt are aligned with a plurality of apertures of the cabinet side walls of the fiber optic cabinet. The method further comprises matingly engaging the transition skirt with a cabinet bottom support portion of a second fiber optic cabinet such that cabinet flange portions extending downwardly from the cabinet bottom support portion of the second fiber optic cabinet cover respective portions of skirt side walls extending between a top support portion of the transition skirt and the bottom support portion of the transition skirt. Apertures of the cabinet flange portions of the second fiber optic cabinet are aligned with a plurality of apertures of the skirt side walls of the transition skirt.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIGS. 3A and 3B are front and rear perspective views of the transition skirt of FIGS. 1A and 1B illustrating additional details of the transition skirt;

DETAILED DESCRIPTION

Figure 1A:
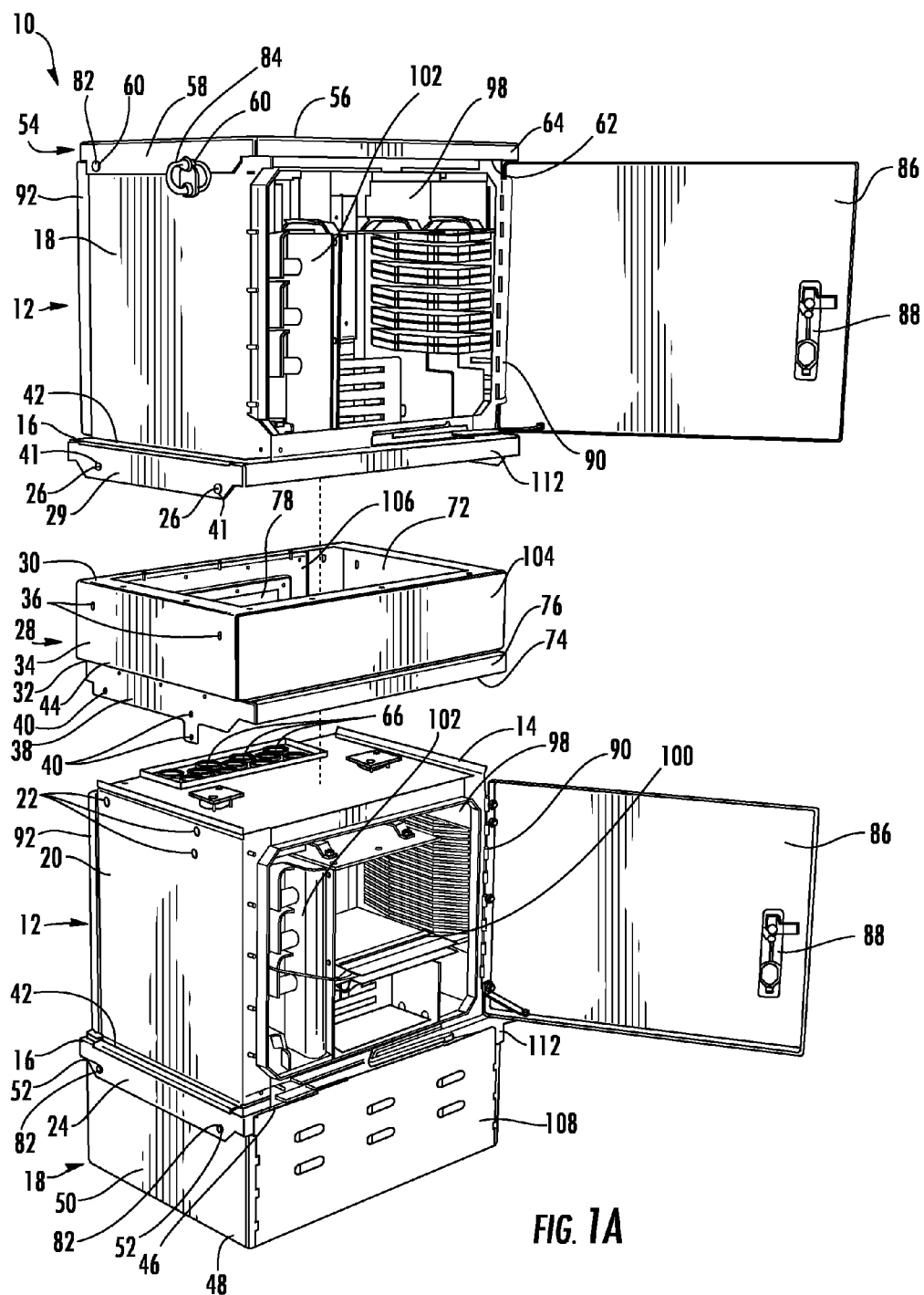
FIGS. 1A and 1B are front and rear exploded perspective views of a modular fiber optic cabinet system having a transition skirt interposed between a pair of fiber optic cabinets, according to an embodiment.

Reference will now be made in detail to the present preferred embodiments, examples of which are illustrated in the accompanying drawings. Whenever possible, the same reference numerals will be used throughout the drawings to refer to the same or like parts.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first fiber optic cabinet" and "second fiber optic cabinet," and does not imply a priority, a type, an importance, or other attribute, unless otherwise stated herein. As used herein and in the claims, the articles "a" and "an" in reference to an element refers to "one or more" of the element unless otherwise explicitly specified.

Embodiments of the disclosure include systems for stacking modular fiber optic cabinets, and related devices, components, and methods. In one embodiment, a modular fiber optic cabinet system comprises a fiber optic cabinet and a transition skirt. The fiber optic cabinet comprises a cabinet top support portion and a cabinet bottom support portion. A pair of cabinet sidewalls extends therebetween to define an interior space for installing and storing fiber optic equipment, such as fiber optic cassettes, fiber optic panels, fiber optic modules, and fiber optic cable, for example. The cabinet bottom support portion can be supported by a base, with cabinet flange portions extending downwardly from the cabinet bottom support portion. The pair of cabinet side walls and the pair of cabinet flange portions both have a plurality of apertures extending therethrough to facilitate mounting the fiber optic cabinet to other modular elements, such as the base or the transition skirt, for example.

The transition skirt comprises a skirt top support portion and a skirt bottom support portion, with a pair of skirt side walls extending therebetween. A pair of skirt flange portions extends downwardly from the skirt bottom support portion, and both the skirt top support portion and the skirt bottom support portion have a plurality of apertures extending therethrough to facilitate mounting the transition skirt to other modular elements, such as the fiber optic cabinet. In this embodiment, the skirt bottom support portion of the transition skirt is configured to matingly engage with the top support portion of the fiber optic cabinet. In this configuration, the skirt flange portions of the transition skirt cover respective portions of the cabinet side walls, and the plurality of apertures of the skirt flange portions are aligned with the plurality of apertures of the cabinet side walls, thereby facilitating attachment of the transition skirt to the top of the fiber optic cabinet. The skirt top support portion of the transition skirt is similarly configured to matingly engage with the cabinet bottom support portion of the fiber optic cabinet. In this configuration, the cabinet flange portions of the fiber optic cabinet cover respective portions of the skirt side walls, and the plurality of apertures of the cabinet flange portions are aligned with the plurality of apertures of the skirt side walls.

This arrangement permits a pair of fiber optic cabinets to be stacked one on top of the other, with the transition skirt disposed therebetween to secure the fiber optic cabinets to each other. For example, a first fiber optic cabinet can be installed on a base, and a transition skirt can be installed on the top of the first fiber optic cabinet. A second fiber optic cabinet can then be installed on the top of the transition skirt. In this manner, a smaller, modular fiber optic cabinet can be installed in a location where less fiber optic capacity is needed, and additional fiber optic cabinets can be added over time as capacity requirements increase, without increasing the footprint of the original installation.

Figure 1B:
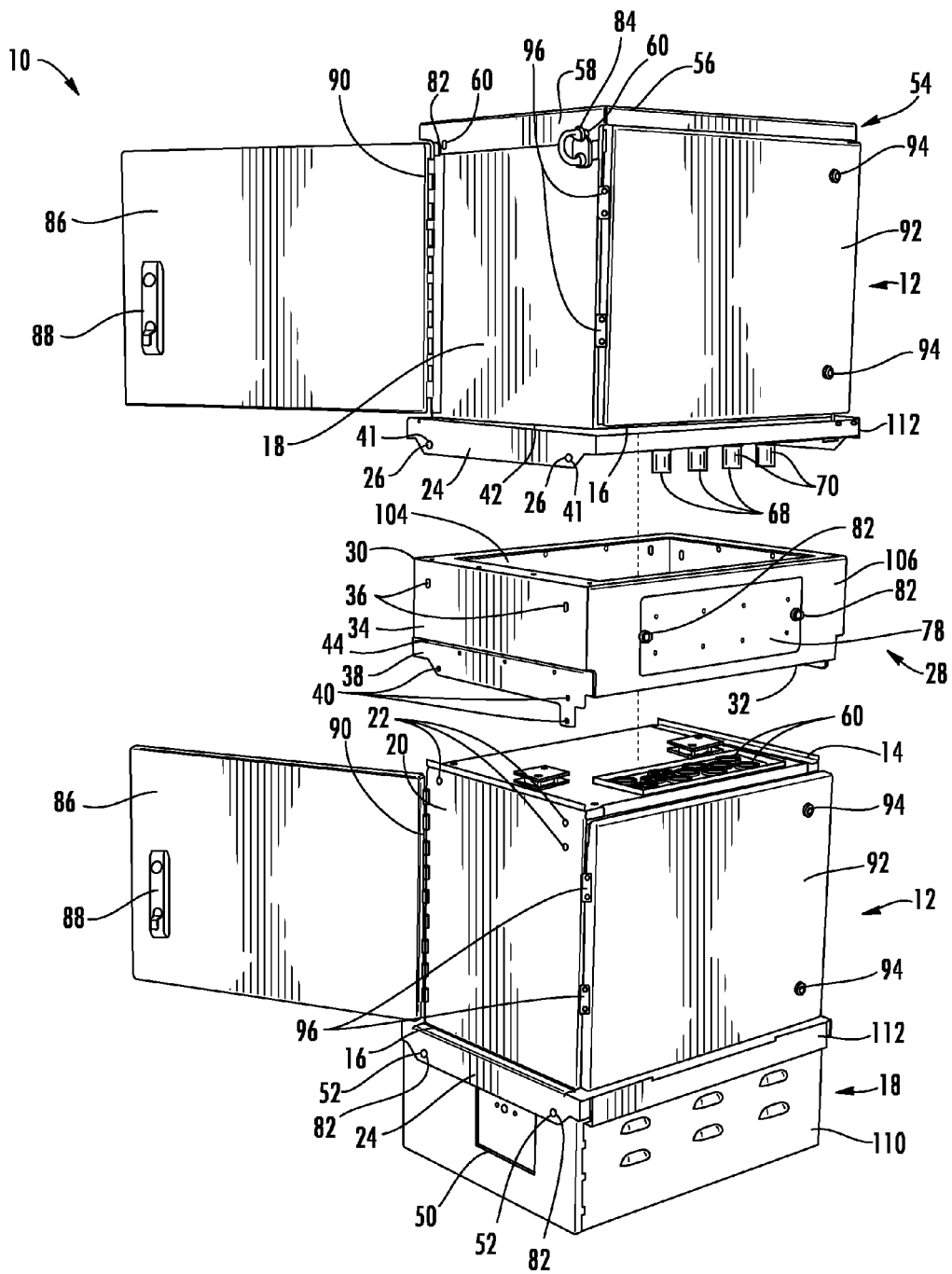

In this regard, FIGS. 1A and 1B illustrate a modular fiber optic cabinet system 10 having an intermediate transition skirt according to an embodiment. The system 10 includes a plurality of fiber optic cabinets 12 configured to be stacked together in a single installation. Each fiber optic cabinet 12 includes a cabinet top support portion 14 configured to support equipment above the fiber optic cabinet 12, and a cabinet bottom support portion 16 configured to be supported by equipment underneath the fiber optic cabinet 12. In this embodiment, for example, one of the fiber optic cabinets 12 is mounted to and supported by a base 18 configured to be disposed on a substantially flat indoor or outdoor surface, such as a floor or concrete side, for example.

Each fiber optic cabinet 12 includes a pair of cabinet side walls 20 extending between the cabinet top support portion 14 and the cabinet bottom support portion 16. Each cabinet side wall 20 has a plurality of apertures 22 therethrough. As will be discussed in detail below, these apertures 22 are used to fasten the fiber optic cabinet 12 to compatible modular components described below. The fiber optic cabinet 12 also includes a pair of cabinet flange portions 24 extending downwardly from the cabinet bottom support portion 16. The cabinet flange portions 24 also have a plurality of apertures 26 for facilitating fastening the fiber optic cabinet 12 to other modular elements, such as, for example the base 18 or a transition skirt 28, described in detail below.

In this regard, the transition skirt 28 of this embodiment is configured to be stacked between successive fiber optic cabinets 12. The transition skirt 28 comprises a skirt top support portion 30 and a skirt bottom support portion 32, with a pair of skirt side walls 34 extending therebetween. Each of the skirt side walls 34 has a plurality of apertures 36 in a similar pattern to apertures 26 of the cabinet flange portions 24. As a result, when a fiber optic cabinet 12 is stacked on the top of the transition skirt 28, the skirt top support portion 30 of the transition skirt 28 matingly engages and supports the cabinet bottom support portion 16 of the fiber optic cabinet 12.

The transition skirt also has a pair of skirt flange portions 38 extending downwardly from the skirt bottom support portion 32. The skirt flange portions 38 also have a plurality of apertures 40 for facilitating fastening the transition skirt 28 between stacked fiber optic cabinets 12 or other modular components.

When the transition skirt 28 is stacked on the top of one of the fiber optic cabinets, the apertures 40 of the skirt flange portions 38 of the transition skirt 28 are aligned with the apertures 22 in the cabinet side walls 20 of the fiber optic cabinet 12. This arrangement permits one or more fasteners 41 to be disposed in the aligned apertures 22, 40 to secure the cabinet top support portion 14 of the fiber optic cabinet 12 to the skirt bottom support portion 32 of the transition skirt 28.

Similarly, when another fiber optic cabinet 12 is stacked on the top of the transition skirt 28, the apertures 26 of the cabinet flange portions 24 of the fiber optic cabinets 12 are aligned with the apertures 36 in the skirt side walls 34 of the transition skirt 28. This arrangement permits one or more fasteners to be disposed in the aligned apertures 26, 36 to secure the cabinet bottom support portion 16 of the fiber optic cabinet 12 to the skirt top support portion 30 of the transition skirt 28. In this embodiment as well, the plurality of apertures 36 of each of the skirt side walls 34 of the transition skirt 28 are arranged in a first pattern, and the plurality of apertures 40 of each of the skirt flange portions 38 of the transition skirt 28 are arranged in a second pattern different from the first pattern. Similarly, the plurality of apertures 22 of each of the cabinet side walls 20 of the fiber optic cabinet 12 are arranged in the second pattern to align with the plurality of apertures 40 of each of the skirt flange portions 38 of the transition skirt 28, and the plurality of apertures 26 of each of the cabinet flange portions 24 of the fiber optic cabinet 12 are arranged in the first pattern to align with the plurality of apertures 36 of each of the skirt side walls 34 of the transition skirt 28.

In this embodiment, the fiber optic cabinet 12 includes a pair of outwardly extending ledge portions 42 extending between each cabinet side wall 20 and a respective cabinet flange portion 24. In this embodiment, the outwardly extending ledge portions 42 are parallel to each other and extend away from each other. Similarly, the transition skirt 28 has a pair of parallel inwardly extending ledge portions 44 extending between each skirt side wall 34 and respective skirt flange portion 38 toward each other. The outwardly extending ledge portions 42 and inwardly extending ledge portions 44 are provided to align the cabinet flange portions 24 and skirt flange portions 38 with standardized features commonly used with fiber optic cabinet assemblies. For example, the outwardly extending ledge portions 42 of the fiber optic cabinet 12 are provided to align the cabinet flange portions 24 with a base top support portion 46 of the base 18, which may have standardized dimensions within the fiber optic industry. In this embodiment, for example, base 18 also has a base bottom support portion 48, with a pair of base side walls 50 extending between the base top support portion 46 and the base bottom support portion 48. The base side walls 50 have a plurality of apertures 52 having similar configuration to apertures 36 of the skirt side walls 34 of the transition skirt 28. This arrangement permits the fiber optic cabinets 12 to be interchangeably mounted onto either of the base top support portion 46 of the base 18 or the skirt top support portion 30 of the transition skirt 28.

Similarly, a top cover 54 is configured to be mounted over the cabinet top support portion 14 of a fiber optic cabinet 12 in a standardized configuration. The top cover 54 has a cover portion 56 and a pair of cover flange portions 58 extending downwardly from opposite sides of the cover portion 56. Each cover flange portion 58 has a plurality of apertures 60 having a similar configuration to the apertures 40 of skirt flange portions 38 of the transition skirt 28. In this manner, either of the top cover 54 or transition skirt 28 may be interchangeably mounted on the cabinet top support portion 14 of the fiber optic cabinet 12, with either the apertures 40 of the skirt flange portions 38 of the transition skirt 28 or the apertures 60 of the cover flange portions 58 of the top cover 54 being aligned with apertures 22 of the cabinet side walls 20 of the fiber optic cabinets 12. In this embodiment, a distance between the skirt flange portions 38 of the transition skirt 28 is substantially equal to a width of the cabinet top support portion 14 of the fiber optic cabinet 12, and a distance between the cabinet flange portions 24 of the fiber optic cabinet 12 is substantially equal to a width of the skirt top support portion 30 of the transition skirt 28. In this embodiment as well, a distance between the skirt flange portions 38 of the transition skirt 28 is less than a distance between the cabinet flange portions 24 of the fiber optic cabinet 12. This is because the width of the cabinet top support portion 14 of the fiber optic cabinet 12 is also less than a distance between the cabinet flange portions 24 of the fiber optic cabinet 12, which makes it difficult to securely or stably stack fiber optic cabinets 12 directly on the top of each other without using the transition skirt 28.

Another feature of the top cover 54 is a top vent 62 formed by an overhang portion 64 of the top cover 54. The top vent 62 permits airflow through the fiber optic cabinet 12 while the overhang portion 64 protects the interior of the fiber optic cabinet 12 from exposure to external elements, such as liquid or debris. In this embodiment, the fiber optic cabinet 12 includes a plurality of cabinet top apertures 66 disposed in the cabinet top support portion 14 of the fiber optic cabinet 12. The cabinet top apertures 66 permit airflow through the fiber optic cabinet 12 and also permit fiber optic cables and other fiber optic equipment to be passed into and out of the fiber optic cabinet 12. Similarly, each fiber optic cabinet 12 includes a plurality of cabinet bottom apertures 68 disposed in the cabinet bottom support portion 16 of the fiber optic cabinet 12.

In this embodiment, a plurality of downward extending tubes 70 extend downwardly from the cabinet bottom support portion 16 of the fiber optic cabinet 12. As with the cabinet top apertures 66 described above, the cabinet bottom apertures 68, which extend through the tubes 70 in this embodiment, also permit airflow through the fiber optic cabinet 12 and also permit fiber optic cables and other fiber optic equipment to be passed into and out of the fiber optic cabinet 12. In this manner, when a fiber optic cabinet 12 is stacked on top of a transition skirt 28, which is itself stacked on top of another fiber optic cabinet 12, the cabinet bottom apertures 68 of the upper fiber optic cabinet 12 and the cabinet top apertures 66 of the bottom fiber optic cabinet 12 are both in communication with a skirt recess 72 defined by the transition skirt 28. In this manner, fiber optic cables and other fiber optic equipment may be passed between the upper and lower fiber optic cabinets 12 without exposing the fiber optic cables and other fiber optic equipment to external conditions.

The transition skirt 28 also includes a skirt vent 74 defined by a skirt overhang portion 76. The skirt vent 74 provides airflow into and out of the fiber optic cabinet 12 below the transition skirt 28, similar to the top vent 62 of the top cover 54, described above. In this manner, the transition skirt 28 conforms to the same ventilation requirements for the lower fiber optic cabinet 12 as the top cover 54 for the upper fiber optic cabinet 12. Likewise, the skirt overhang portion 76 is configured to protect the interior of the fiber optic cabinet 12 in a similar manner to overhang portion 64 of the top cover 54. In this manner, the skirt overhang portion 76 is configured to permit air flow between the overhang portion 76 of the transition skirt 28 and the cabinet top support portion 14 of the fiber optic cabinet 12 in response to matingly engaging the fiber optic cabinet 12 with the skirt bottom support portion 32 of the transition skirt 28. The transition skirt 28 further includes a skirt rear access panel 78 that may be held in place by a plurality of skirt rear access fasteners 80. Similarly, a plurality of bolts 82 and J-plugs 84 may be used as desired to fasten the various modular components to each other.

Each fiber optic cabinet 12 has a front cabinet door 86 having a cabinet latch 88 and movable between a closed and open position via one or more cabinet hinges 90. The fiber optic cabinet 12 may also include a cabinet rear access panel 92 secured by cabinet rear access fasteners 94, and moveable between a closed and open position by cabinet rear access hinges 96. The front cabinet door 86 and cabinet rear access panel 92 each provide access to the interior of the fiber optic cabinet 12 to install and manipulate fiber optic equipment, such as a fiber optic chassis 98. In this example, the fiber optic chassis 98 is used to mount fiber optic cassettes s therein (not shown), and also includes a slack storage area 102 for storing excess lengths of fiber optic cable.

In this manner, a plurality of stacked fiber optic cabinets 12 can be substituted for a single larger fiber optic cabinet (not shown) without sacrificing optical fiber connection capacity of the larger fiber optic cabinet. For example, in this embodiment, the fiber optic cabinet 12 is a distribution hub cabinet that is able to accommodate up to 288 distribution fibers whereas a stacked pair of fiber optic cabinets 12 is able to accommodate up to 576 distribution fibers. Unlike a larger, conventional fiber optic distribution hub cabinet having a similar capacity, an installation can begin with a single, smaller, and less expensive fiber optic cabinet 12 having a capacity of 288 distribution fibers if less capacity is needed, and the fiber optic cabinet 12 installation can be scaled up to a 576 distribution fiber capacity by adding a second, stacked fiber optic cabinet 12 at a later date with minimal installation cost or effort, when such capacity is required.

Figure 2A:
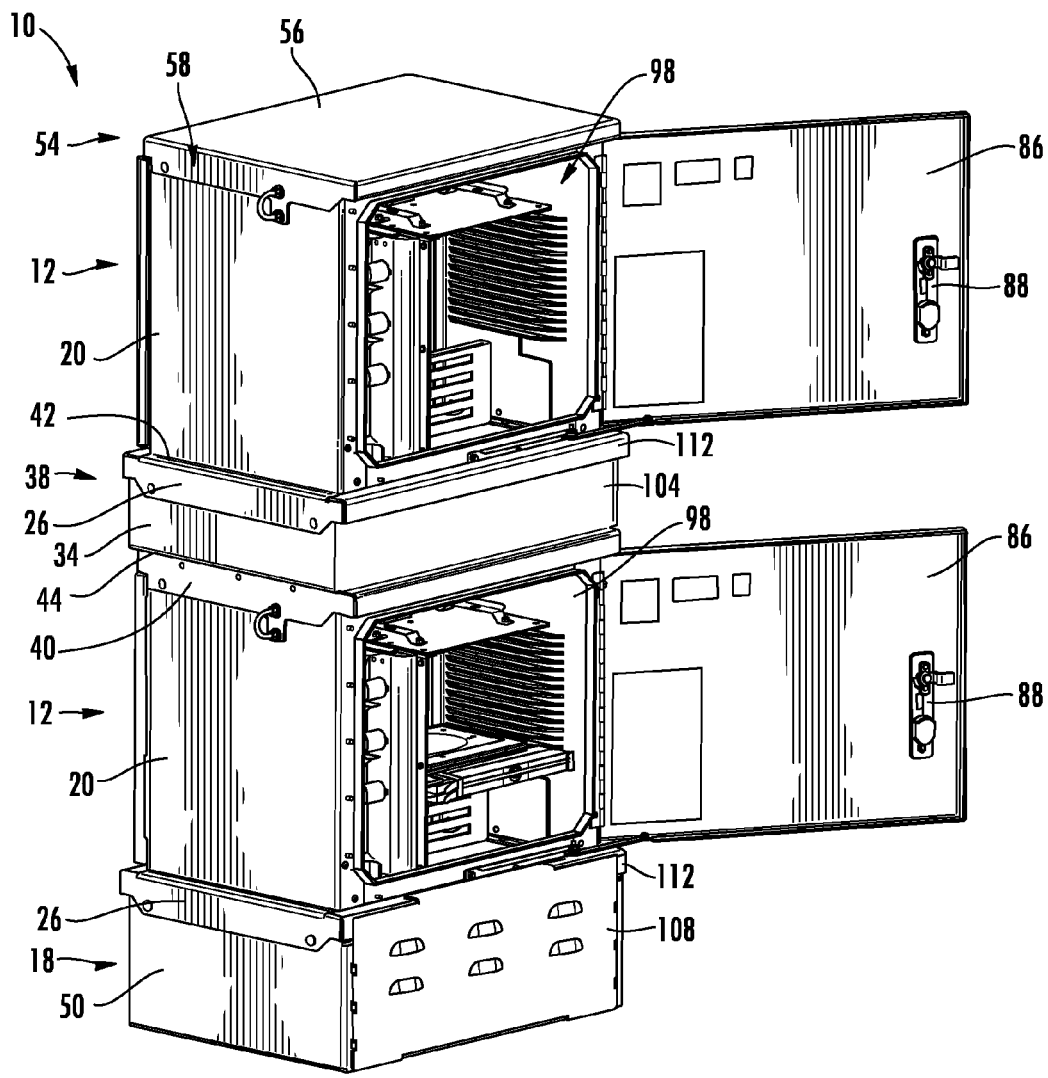
FIGS. 2A and 2B are front and rear perspective views of the system of FIGS. 1A and 1B in a fully assembled configuration.
Figure 2B:
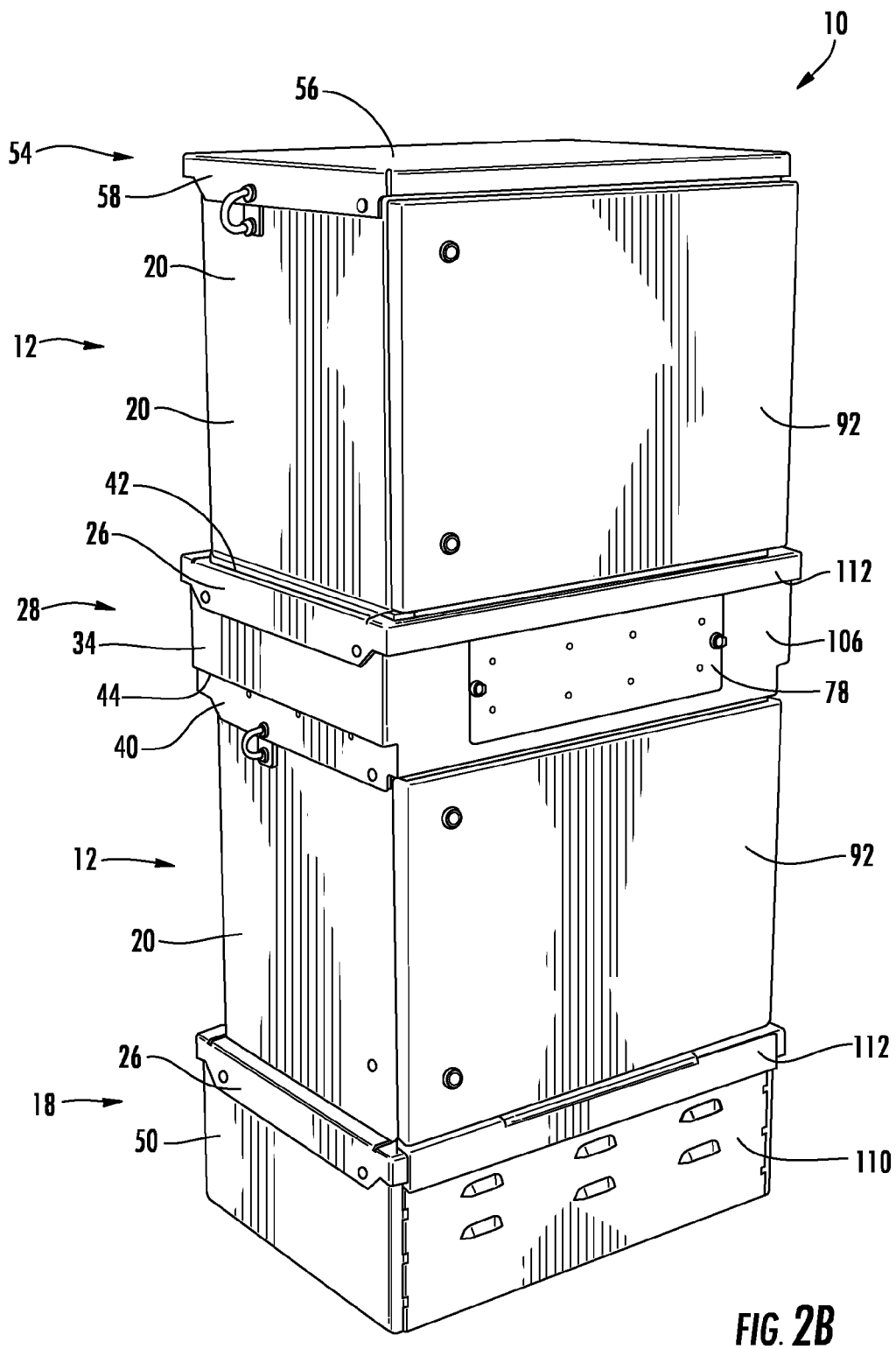

Referring now to FIGS. 2A and 2B, front and rear perspective views of the system 10 of FIGS. 1A and 1B in a fully assembled configuration are disclosed. As can be seen in FIGS. 2A and 2B, the cabinet flange portions 24 of each fiber optic cabinet 12 are configured to align with both the base side walls 50 of the base 18 and the skirt side walls 34 of the transition skirt 28. In this manner, the transition skirt 28 may be made backward-compatible with existing fiber optic cabinets 12 configured to be mounted on a conventional base 18. Alternatively, the base 18, fiber optic cabinets 12, and transition skirt 28 can be customized during the design phase to include these features. Similarly, the cabinet top support portion (not shown) of each fiber optic cabinet 12 is configured to be engaged with and partially covered by both the cover flange portions 58 of the top cover 54 and the skirt flange portions 38 of the transition skirt 28. As with the base 18, the transition skirt 28 can be made backward compatible with existing fiber optic cabinets 12, or the transition skirt 28, fiber optic cabinet 12, and top cover 54 may alternatively be customized together during the design phase to include these features.

Figure 3B:
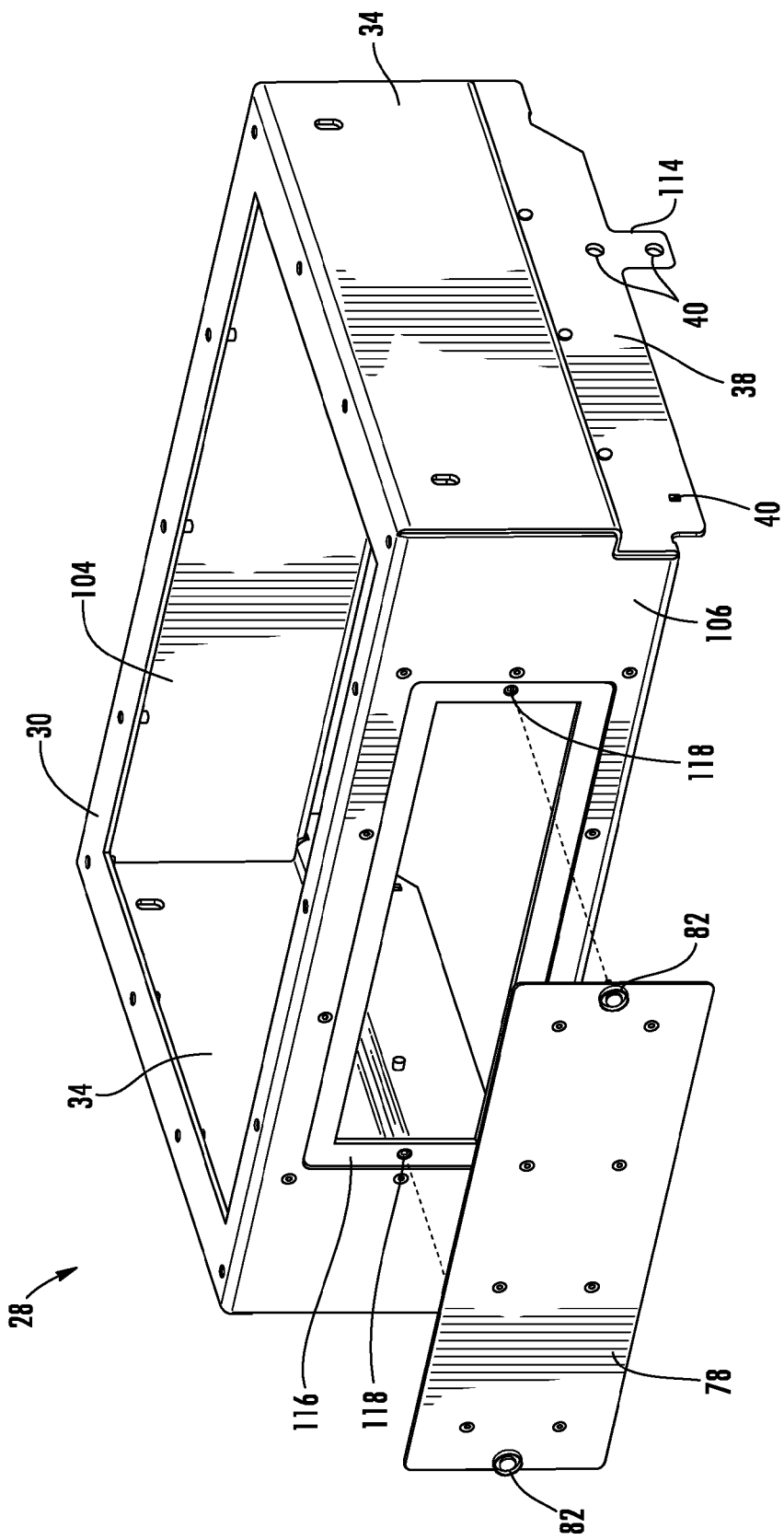

Referring now to FIGS. 3A and 3B, front and rear perspective views of the transition skirt 28 of FIGS. 1A and 1B are provided to illustrate additional details of the transition skirt 28. In this regard, FIG. 3A illustrates the skirt rear wall 106 having the skirt rear access panel 78 installed, and FIG. 3B illustrates the skirt rear wall 106 having the skirt rear access panel 78 removed. In this embodiment, the skirt rear wall 106 includes a recessed portion 116 configured to receive the skirt rear access panel 78 such that the skirt rear access panel 78 is flush with the skirt rear wall 106 when the skirt rear access panel 78 is installed on the skirt rear wall 106 of the transition skirt 28. In this embodiment, the recessed portion 116 further includes a pair of apertures 118 configured to receive and secure bolts 82 or other types of fasteners when the skirt rear access panel 78 is installed on the skirt rear wall 106 of the transition skirt 28.

Figure 4:
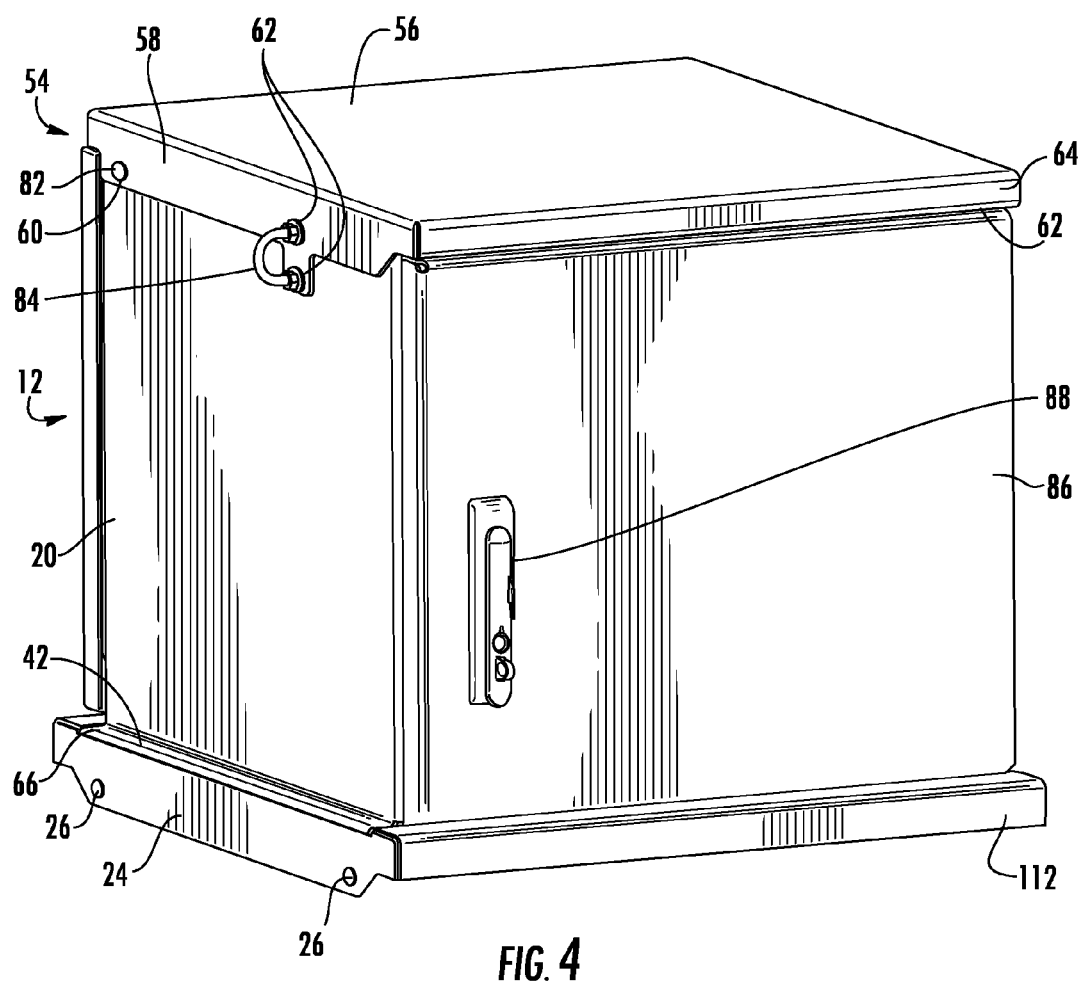
FIG. 4 is a perspective view of the fiber optic cabinet of FIGS. 1A and 1B illustrating additional details of the fiber optic cabinet and attached top cover.
Figure 5A:
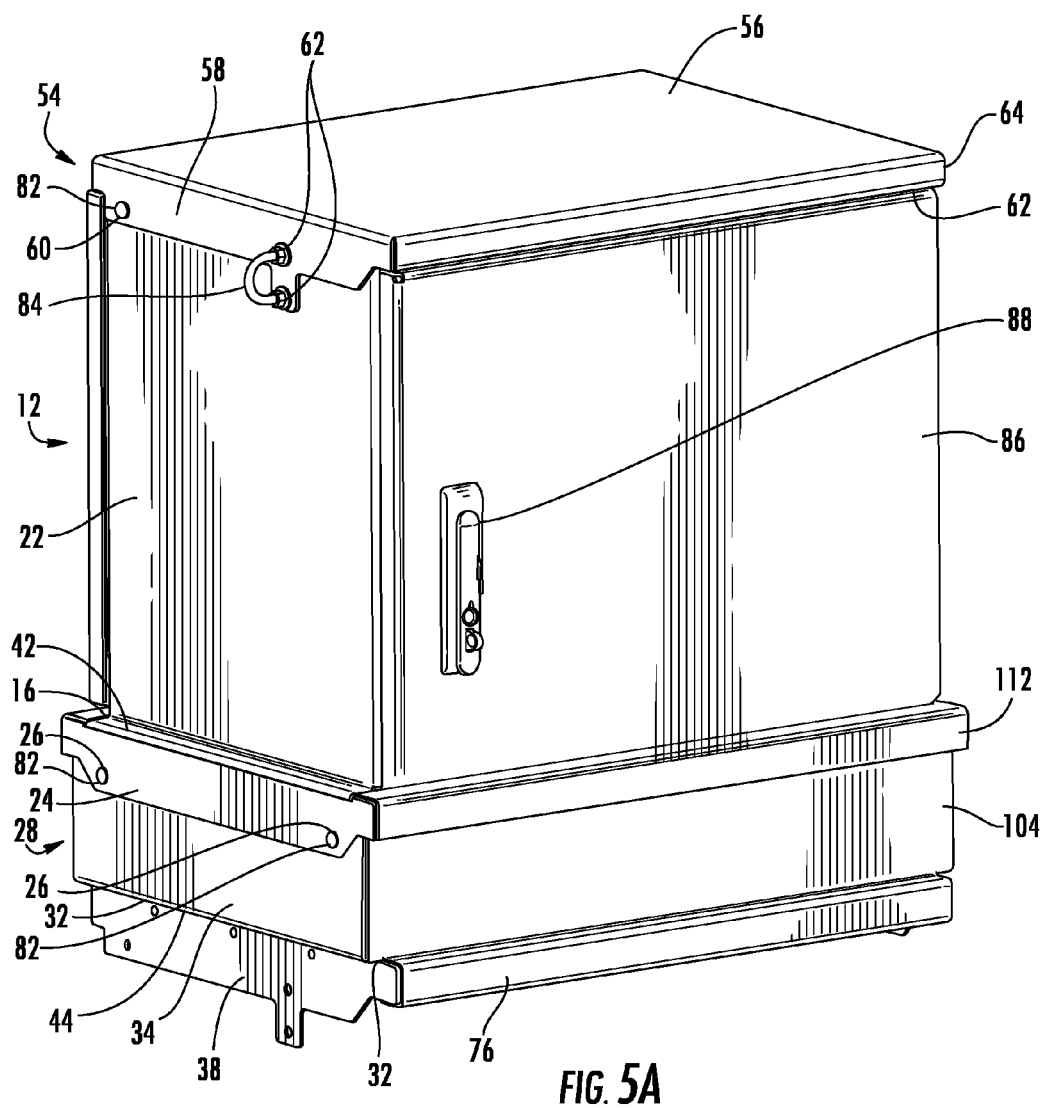
FIGS. 5A and 5B are front and rear perspective views of the fiber optic cabinet and transition skirt of FIGS. 1A and 1B illustrating additional details of the fiber optic cabinet and transition skirt sub-assembly.
Figure 5B:
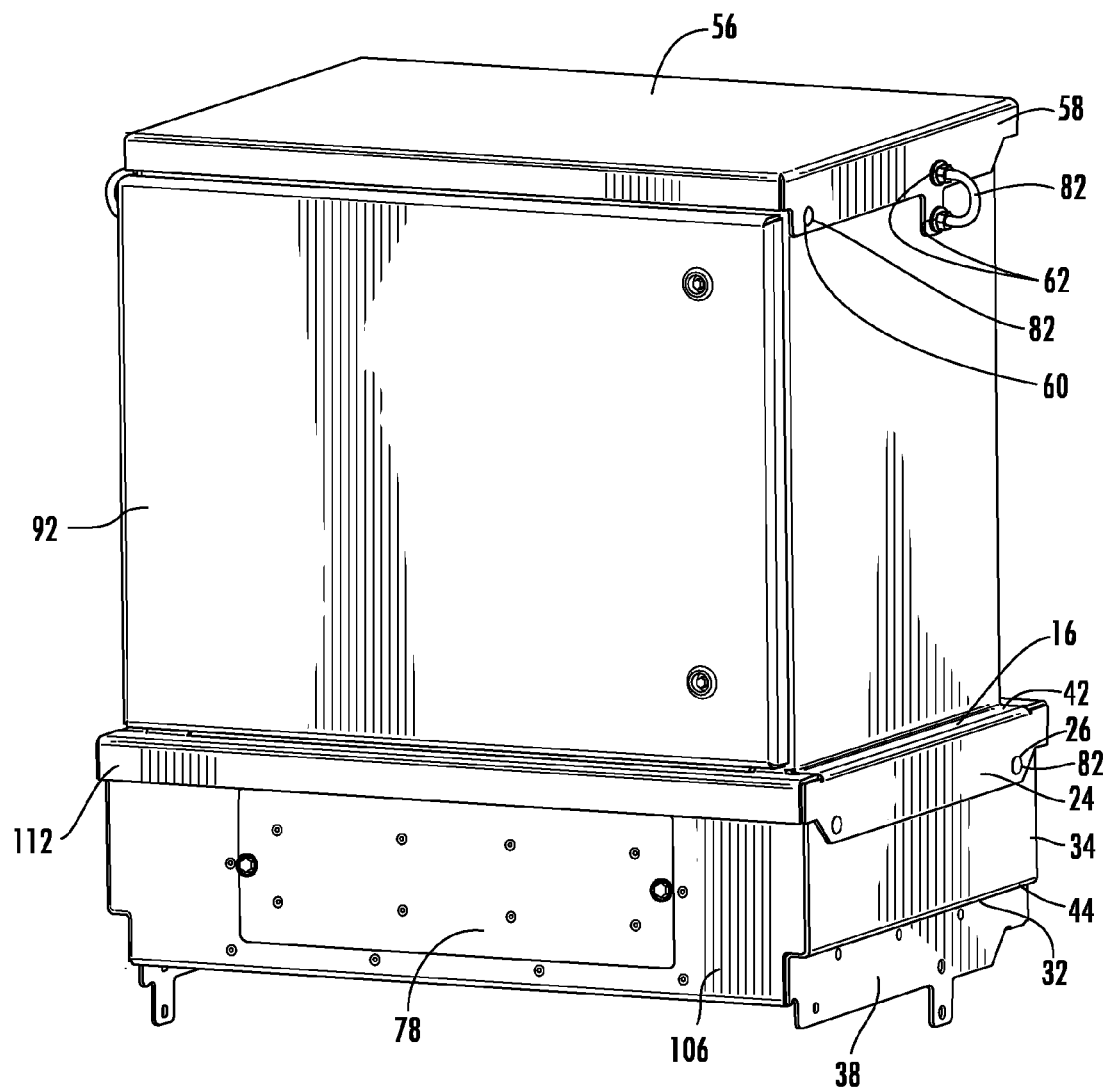

The various components described herein, including for example the fiber optic cabinets 12, transition skirt 28, base 18, and top cover 54, may be provided separately or together in different combinations. In this regard, FIG. 4 is a perspective view of a fiber optic cabinet 12 of FIGS. 1A and 1B illustrating additional details of the fiber optic cabinet 12 and attached top cover 54. Here, the fiber optic cabinet 12 may be packaged together as a sub-assembly with a top cover 54. This fiber optic cabinet 12 and top cover 54 sub-assembly may be configured to be installed on an existing base, such as base 18, having compatible features. Similarly, FIGS. 5A and 5B are front and rear perspective views of the fiber optic cabinet 12 and transition skirt 28 of FIGS. 1A and 1B illustrating additional details of the fiber optic cabinet 12 and transition skirt 28 sub-assembly. Here, the fiber optic cabinet 12 and top cover 54 may be packaged with the transition skirt 28 as a sub-assembly. This fiber optic cabinet 12, transition skirt 28, and top cover 54 sub-assembly may be configured to be installed on an existing fiber optic cabinet 12 installation having compatible features without the need to disassemble or uninstall the existing installation. For example, by removing the top cover 54 from the fiber optic cabinet 12 of FIG. 4, the fiber optic cabinet 12, transition skirt 28, and top cover 54 sub-assembly may be installed directly on the top of the fiber optic cabinet 12 of FIG. 4.

Figure 6:
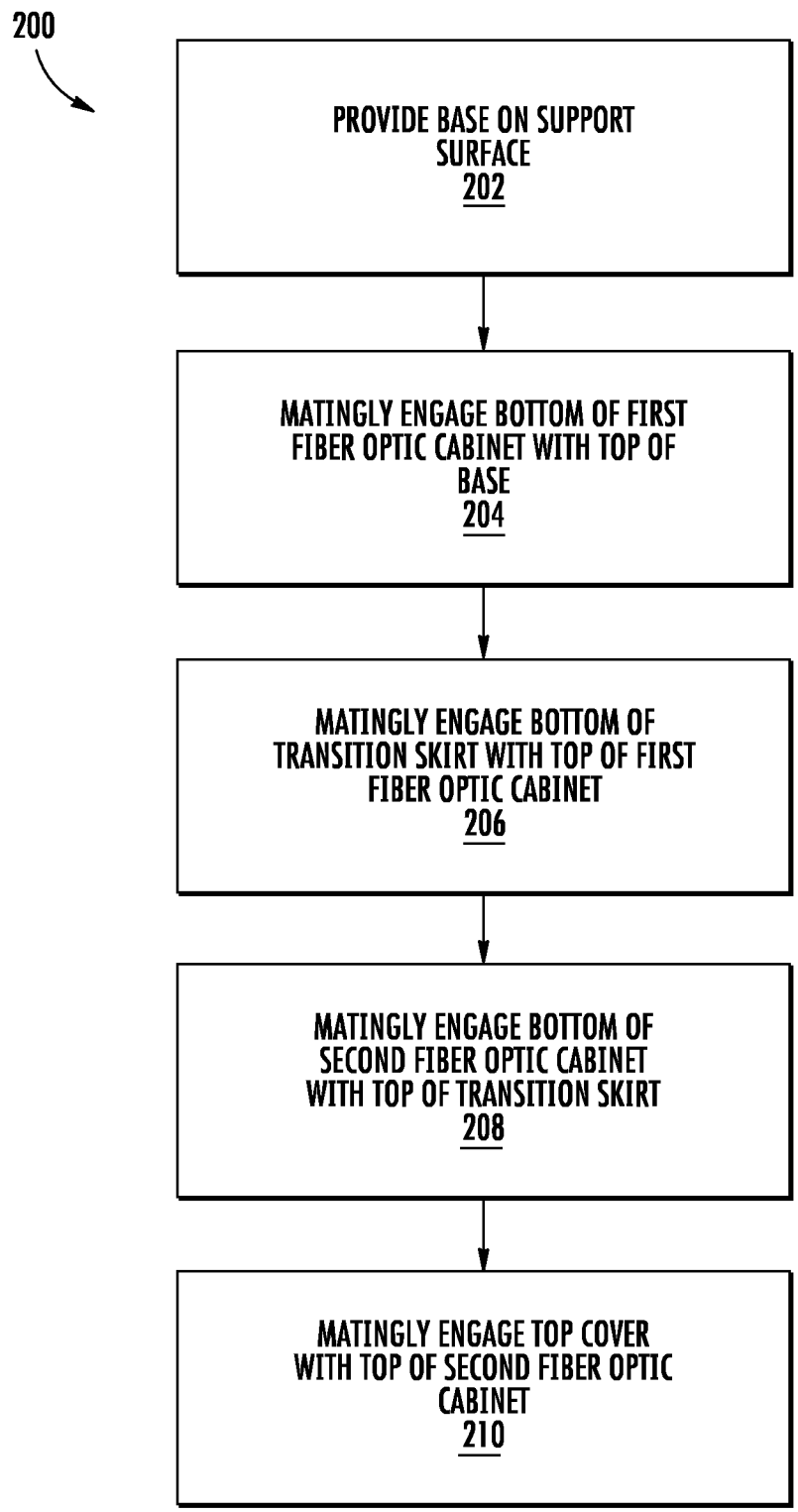
FIG. 6 is a flowchart of a method of assembling a modular fiber optic cabinet system such as the system of FIGS. 1A and 1B.

Referring now to FIG. 6, a flowchart illustrating a method 200 of assembling a modular fiber optic cabinet system, such as the system 10 of FIGS. 1A and 1B, is provided according to an embodiment. The method 200 comprises first providing a base, such as base 18 of FIGS. 1A and 1B for example, on a support surface (Block 202). The method 200 of FIG. 6 further comprises matingly engaging a cabinet bottom support portion of a first fiber optic cabinet, such as fiber optic cabinet 12 of FIGS. 1A and 1B, to the base (Block 204). The method 200 of FIG. 6 further comprises matingly engaging a skirt bottom support portion of a transition skirt, such as the transition skirt 28 of FIGS. 1A and 1B, with a cabinet top support portion of the first fiber optic cabinet (Block 206). This causes cabinet flange portions extending downwardly from a skirt bottom support portion of the transition skirt to cover the respective portions of cabinet side walls extending between the top support portion of the first fiber optic cabinet and the bottom support portion of the first fiber optic cabinet. This in turn causes apertures of the skirt flange portions of the transition skirt to be aligned with a plurality of apertures of the cabinet side walls of the fiber optic cabinet, thereby facilitating attachment of the transition skirt to the first fiber optic cabinet. The method 200 further comprises matingly engaging the transition skirt with a cabinet bottom support portion of a second fiber optic cabinet, such as the fiber optic cabinet 12 of FIGS. 1A and 1B, (Block 208). This causes cabinet flange portions extending downwardly from the cabinet bottom support portion of the fiber optic cabinet to cover the respective portions of skirt side walls extending between a top support portion of the transition skirt and the bottom support portion of the transition skirt. This in turn causes a plurality of apertures of the cabinet flange portions of the fiber optic cabinet to be aligned with a plurality of apertures of the skirt side walls of the transition skirt, thereby facilitating attachment of the transition skirt to the second fiber optic cabinet. The method 200 of FIG. 6 further comprises matingly engaging a top cover, such as the top cover 54 of FIGS. 1A and 1B, with the cabinet top support portion of the second fiber optic cabinet to enclose and protect the top of the fiber optic cabinet installation (Block 210).

It will be apparent to those skilled in the art that various modifications and variations can be made without departing from the spirit or scope of the invention.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, which are hereby incorporated by reference for this purpose.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:
1. A modular fiber optic cabinet system comprising:
   a fiber optic cabinet comprising:
      a cabinet top support portion;
      a cabinet bottom support portion configured to be supported by a base;
      a pair of cabinet side walls each extending between the cabinet top support portion and the cabinet bottom support portion, each cabinet side wall having a plurality of apertures therethrough;
      a pair of cabinet flange portions each having a plurality of apertures extending therethrough, each cabinet flange portion extending downwardly from the cabinet bottom support portion,
   a transition skirt comprising:
      a skirt top support portion;
      a skirt bottom support portion;
      a pair of skirt side walls each extending between the skirt top support portion and the skirt bottom support portion, each skirt side wall having a plurality of apertures therethrough;
      a pair of skirt flange portions each having a plurality of apertures extending therethrough, each skirt flange portion extending downwardly from the skirt bottom support portion, wherein the transition skirt is configured to matingly engage with the top support portion of the fiber optic cabinet such that when the transition skirt is engaged with the top support portion, the skirt flange portions of the transition skirt cover respective portions of the cabinet side walls, and the plurality of apertures of the skirt flange portions are aligned with the plurality of apertures of the cabinet side walls, and wherein the transition skirt is configured to matingly engage with the cabinet bottom support portion of the fiber optic cabinet such that when the transition skirt is engaged with the cabinet bottom support portion, the cabinet flange portions of the fiber optic cabinet cover respective portions of the skirt side walls, and the plurality of apertures of the cabinet flange portions are aligned with the plurality of apertures of the skirt side walls.

2. The system of claim 1, wherein the skirt bottom support portion of the transition skirt comprises a pair of skirt ledge portions extending toward each other, each skirt ledge portion extending between a respective skirt side wall and a respective skirt flange portion.

3. The system of claim 2, wherein a distance between the skirt flange portions of the transition skirt is substantially equal to a width of the cabinet top support portion of the fiber optic cabinet.

4. The system of claim 3, wherein the cabinet bottom support portion of the fiber optic cabinet comprises a pair of cabinet ledge portions extending away from each other, each cabinet ledge portion extending between a respective cabinet side wall and a respective cabinet flange portion.

5. The system of claim 4, wherein a distance between the cabinet flange portions of the fiber optic cabinet is substantially equal to a width of the skirt top support portion of the transition skirt.

6. The system of claim 2, wherein the cabinet bottom support portion of the fiber optic cabinet comprises a pair of cabinet ledge portions extending away from each other, each cabinet ledge portion extending between a respective cabinet side wall and a respective cabinet flange portion.

7. The system of claim 6, wherein a distance between the skirt flange portions of the transition skirt is less than a distance between the cabinet flange portions of the fiber optic cabinet.

8. The system of claim 1, wherein the fiber optic cabinet comprises a first fiber optic cabinet and a second fiber optic cabinet.

9. The system of claim 1, further comprising a base comprising:
a base bottom support portion configured to be supported by a support surface;
a base top support portion; and
a pair of base side walls each extending between the base top support portion and the base bottom support portion, each base side wall having a plurality of apertures therethrough;
wherein the base is configured to matingly engage with the cabinet bottom support portion of the fiber optic cabinet such that when the base is engaged with the cabinet bottom support portion, the cabinet flange portions of the fiber optic cabinet cover the respective portions of the base side walls, and the plurality of apertures of the cabinet flange portions are aligned with the plurality of apertures of the base side walls.

10. The system of claim 1, further comprising a top cover comprising:
a cover portion; and a pair of cover flange portions each having a plurality of apertures extending therethrough, each cover flange portion extending downwardly from the skirt bottom support portion,
wherein the top cover is configured to matingly engage with the top support portion of the fiber optic cabinet such that when the top cover is engaged with the top support portion, the cover flange portions of the top cover cover the respective portions of the cabinet side walls, and the plurality of apertures of the cover flange portions are aligned with the plurality of apertures of the cabinet side walls.

11. The system of claim 1, further comprising a plurality of fasteners, each fastener configured to extend through at least one of the skirt flange portions of the transition skirt and at least one of the plurality of apertures of the cabinet side walls of the fiber optic cabinet to fasten the skirt flange portions of the transition skirt to the cabinet side walls of the fiber optic cabinet.

12. The system of claim 1, further comprising a plurality of fasteners, each fastener configured to extend through at least one of the cabinet flange portions of the fiber optic cabinet and at least one of the plurality of apertures of the skirt side walls of the transition skirt to fasten the cabinet flange portions of the fiber optic cabinet to the skirt side walls of the transition skirt.

13. The system of claim 1, wherein the plurality of apertures of each of the skirt side walls of the transition skirt are arranged in a first pattern, and the plurality of apertures of each of the skirt flange portions of the transition skirt are arranged in a second pattern different from the first pattern.

14. The system of claim 13, wherein the plurality of apertures of each of the cabinet side walls of the fiber optic cabinet are arranged in a second pattern, and the plurality of apertures of each of the cabinet flange portions of the fiber optic cabinet are arranged in the first pattern.

15. The system of claim 1, wherein the fiber optic cabinet comprises a top aperture in the cabinet top support portion and a bottom aperture in the cabinet bottom support portion.

16. The system of claim 15, wherein the transition skirt defines an interior cavity configured to:
communicate with the top aperture of the cabinet top support portion of the fiber optic cabinet when the fiber optic cabinet is engaged with the bottom support portion of the transition skirt; and
communicate with the bottom aperture of the cabinet bottom support portion of the fiber optic cabinet when the fiber optic cabinet is engaged with the top support portion of the transition skirt.

17. The system of claim 1, wherein the transition skirt further comprises an overhang portion configured to permit airflow between the overhang portion of the transition skirt and the cabinet top support portion of the fiber optic cabinet when the fiber optic cabinet is engaged with the bottom support portion of the transition skirt.

18. The system of claim 1, wherein the transition skirt further comprises:
a skirt front wall extending between the skirt side walls of the transition skirt;
a skirt rear wall comprising an aperture therethrough; and
a rear panel configured to removably cover the aperture of the skirt rear wall,
wherein the skirt side walls, the skirt front wall and the skirt rear wall of the transition skirt define an interior cavity of the transition skirt; and
wherein removal of the rear panel from the skirt rear wall of the transition skirt permits access to the interior cavity of the transition skirt via the aperture of the skirt rear wall of the transition skirt.

19. A transition skirt for a modular fiber optic cabinet system, the transition skirt comprising:
a skirt top support portion;
a skirt bottom support portion;
a pair of skirt side walls each extending between the skirt top support portion and the skirt bottom support portion, each skirt side wall having a plurality of apertures therethrough;
a pair of skirt flange portions each having a plurality of apertures extending therethrough, each skirt flange portion extending downwardly from the skirt bottom support portion,
wherein the transition skirt is configured to matingly engage with a top support portion of a fiber optic cabinet such that the skirt flange portions of the transition skirt cover respective portions of cabinet side walls, and the plurality of apertures of the skirt flange portions align with a plurality of apertures of the cabinet side walls, and
wherein the transition skirt is configured to matingly engage with a bottom support portion of the fiber optic cabinet such that cabinet flange portions of the fiber optic cabinet cover respective portions of the skirt side walls, and a plurality of apertures of the cabinet flange portions align with the plurality of apertures of the skirt side walls.

20. A method of assembling a modular fiber optic cabinet system, the method comprising:
matingly engaging a transition skirt with a cabinet top support portion of a first fiber optic cabinet such that cabinet flange portions extending downwardly from a skirt bottom support portion of the transition skirt cover respective portions of cabinet side walls extending between the top support portion of the first fiber optic cabinet and a bottom support portion of the first fiber optic cabinet, wherein a plurality of apertures of the skirt flange portions of the transition skirt are aligned with a plurality of apertures of the cabinet side walls of the fiber optic cabinet; and
matingly engaging the transition skirt with a cabinet bottom support portion of a second fiber optic cabinet such that cabinet flange portions extending downwardly from the cabinet bottom support portion of the second fiber optic cabinet cover respective portions of skirt side walls extending between a top support portion of the transition skirt and the bottom support portion of the transition skirt, wherein a plurality of apertures of the cabinet flange portions of the second fiber optic cabinet are aligned with a plurality of apertures of the skirt side walls of the transition skirt.

* * * * *